US012687196B2

(12) United States Patent    (10) Patent No.:   US 12,687,196 B2
Clerkin et al.      (45) Date of Patent:     Jul. 21, 2026

(54) BEARING STRUCTURE

(71) Applicant: Corsair Memory, Inc., Milpitas, CA (US)

(72) Inventors: Joseph Eamonn L. Clerkin, Milpitas, CA (US); Geoff Lyon, Milpitas, CA (US)

(73) Assignee: Corsair Memory, Inc., Milpitas, CA (US)

( * ) Notice: Subject to any disclaimer, the term of this patent is extended or adjusted under 35 U.S.C. 154(b) by 102 days.

(21) Appl. No.: 18/241,102

(22) Filed: Aug. 31, 2023

(65) Prior Publication Data

US 2024/0344564 A1     Oct. 17, 2024

(30) Foreign Application Priority Data

Apr. 11, 2023    (TW) .................................. 112203293

(51) Int. Cl.
*F16C 17/08*      (2006.01)

(52) U.S. Cl.
CPC .......... *F16C 17/08* (2013.01); *F16C 2360/46* (2013.01)

(58) Field of Classification Search
CPC ............................. F16C 17/08; F16C 2360/40
See application file for complete search history.

(56) References Cited

U.S. PATENT DOCUMENTS

| | | | | |
|---|---|---|---|---|
| 1,675,933 A | * | 7/1928 | Johnson | F16C 17/08 403/138 |
| 3,466,102 A | * | 9/1969 | Goodwyn | F16C 17/08 384/422 |

| | | | | |
|---|---|---|---|---|
| 4,664,595 A | * | 5/1987 | Tsuji | F04D 13/10 384/907 |
| 2004/0189125 A1 | * | 9/2004 | Doemen | H02K 5/1675 310/90 |
| 2005/0035670 A1 | * | 2/2005 | Chen | F16C 17/08 310/10 |

(Continued)

FOREIGN PATENT DOCUMENTS

| | | | | |
|---|---|---|---|---|
| DE | 10032250 A1 | * | 1/2002 | F16C 17/04 |
| WO | WO-03107513 A1 | * | 12/2003 | F16C 17/08 |

OTHER PUBLICATIONS

Machine Translation of DE-10032250-A1 (Year: 2002).*
Machine Translation of WO-03107513-A1 (Year: 2003).*

*Primary Examiner* — Alan B Waits
(74) *Attorney, Agent, or Firm* — Carina M. Tan; Corsair Memory, Inc.

(57) ABSTRACT

A bearing structure includes a base unit, a rotating unit, and a first lubricating unit. The base unit includes a base, a surrounding wall extending downward from the top of the base, a bottom wall connected to the bottom of the surrounding wall, and an accommodating groove defined by the surrounding wall and the bottom wall. The rotating unit includes a rotating shaft arranged in the accommodating groove, and the first lubricating unit includes a rotating shaft arranged in the accommodating groove. The first lubricating unit includes a first bearing arranged in the accommodating groove and connected to the bottom wall. The bottom end of the rotating shaft presses against the upper surface of the first bearing, and the upper surface of the first bearing presents an upward protruding dome shape.

5 Claims, 6 Drawing Sheets

(56)          References Cited

U.S. PATENT DOCUMENTS

2005/0140225 A1*    6/2005   Fujinaka  ............ G11B 19/2009
                                                               310/90
2005/0140229 A1*    6/2005   Wang  ................. F16C 32/0425
                                                               310/90.5
2018/0274548 A1*    9/2018   Vidalenc  ................. F16C 39/02

* cited by examiner

331

BEARING STRUCTURE

CROSS REFERENCE TO RELATED APPLICATIONS

This application claims the benefit of priority to Taiwan patent application no. TW112203293 filed Apr. 11, 2023 entitled "Bearing Structure", the contents of which are incorporated herein by reference in their entirety for all purposes.

TECHNICAL FIELD

The present invention relates to a bearing structure, more particularly relates to a bearing structure that improves lubrication on fan.

DESCRIPTION OF THE PRIOR ART

With the improvement of computer performance, the electronic components within the computer chassis generate a substantial amount of heat. As the cooling fan plays a crucial role in heat dissipation, there is a trend towards downsizing the cooling fan while maintaining its ability to withstand the high-speed rotation of the rotor. Consequently, dynamic pressure bearings are commonly used in the internal structure of most cooling fans.

As shown in FIG. 1, Taiwan Pat. No. 1608169B depicts a fan structure 1 utilizing a dynamic pressure bearing. The fan structure 1 comprises a bottom plate 11, a bottom cover 12, a wear-resistant pad 13, a bearing body 14, a rotating shaft 15, fan blades 16, a stator 17, and a rotor 18. The stator 17 generates electromagnetic force to drive the rotor 18, which, in turn, causes the rotating shaft 15 to rotate while pressing against the wear-resistant pad 13.

Although the prior art fan structure discloses a dynamic pressure bearing, it still has the following disadvantages:
1. Excessive Friction In the prior art fan structure, although the bottom end of the rotating shaft 15 is designed with a dome-shaped profile, the wear-resistant pad 13 that comes into contact with the rotating shaft 15 has a flat structure, which results in a larger contact area. This larger contact area between the rotating shaft 15 and the wear-resistant pad 13 leads to excessive friction. Additionally, the wear-resistant pad 13 is made of soft plastic materials, making it prone to wear due to friction.
2. Limited Lubricant Capacity Due to the flat structure of the wear-resistant pad, there is only a limited space between the bottom cover 12 and the bearing body 14 to hold the lubricating oil. This restricted capacity for lubricating oil leads to inadequate durability of the fan during its operation.
3. Prone to Noise Generation Typically, the rotating shaft 15 is made of hard plastics or metals, while the wear-resistant pad 13 is made of soft plastic materials such as polyester, polytetrafluoroethylene (PTFE), or engineering plastic. When the rotating shaft 15 comes into contact with the wear-resistant pad 13, it tends to produce a dry and irritating noise.

Therefore, there is a need for a fan structure that can reduce the frictional contact area between the rotating shaft and the wear-resistant pad, thereby effectively minimizing operational noise and extending the fan's lifespan.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DESCRIPTION OF EMBODIMENTS

Figure 1:
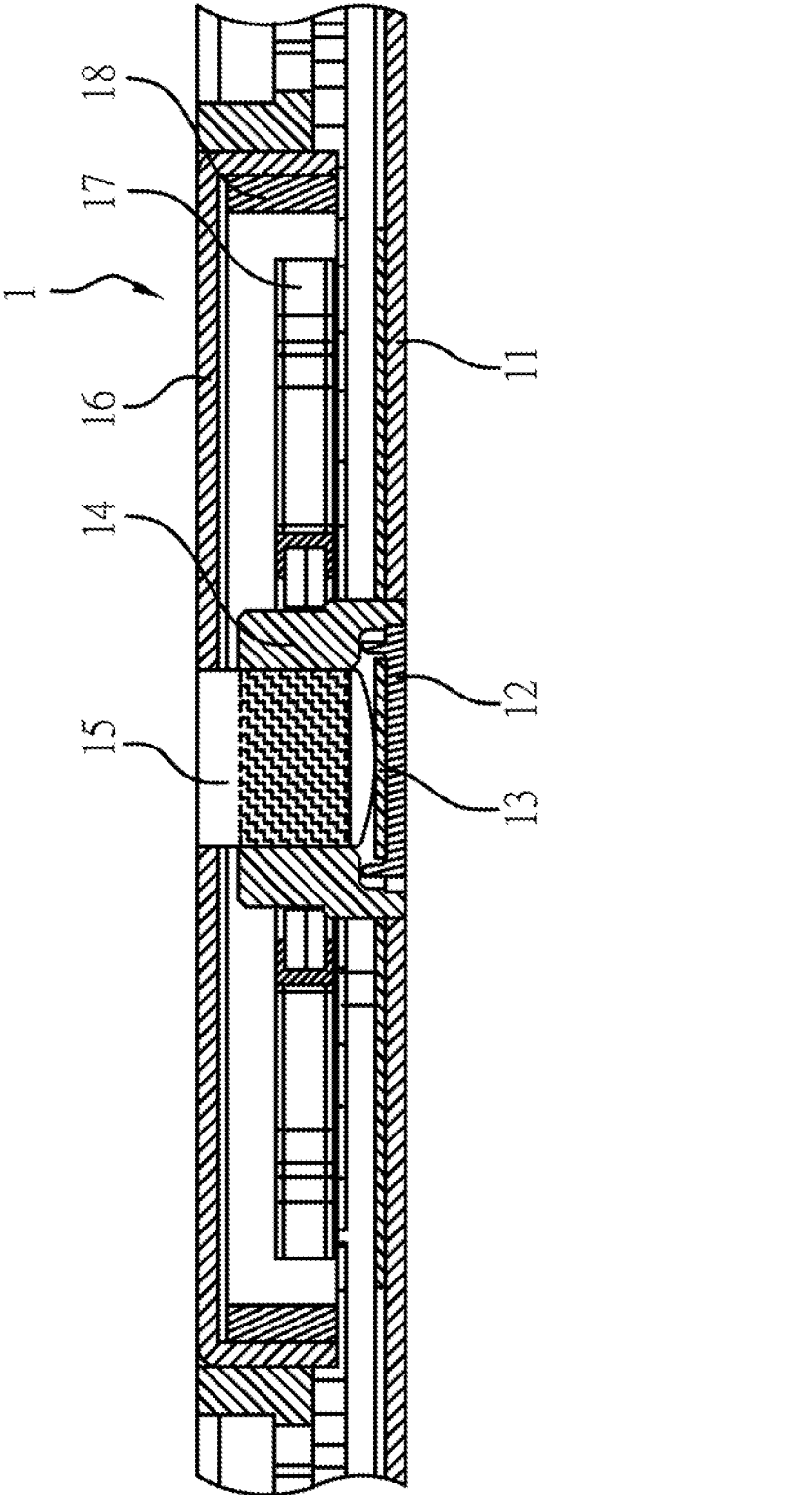
FIG. 1 shows a sectional view of Taiwan Pat. No. 1608169B, depicting a fan structure that utilizes a dynamic pressure bearing.
Figure 2:
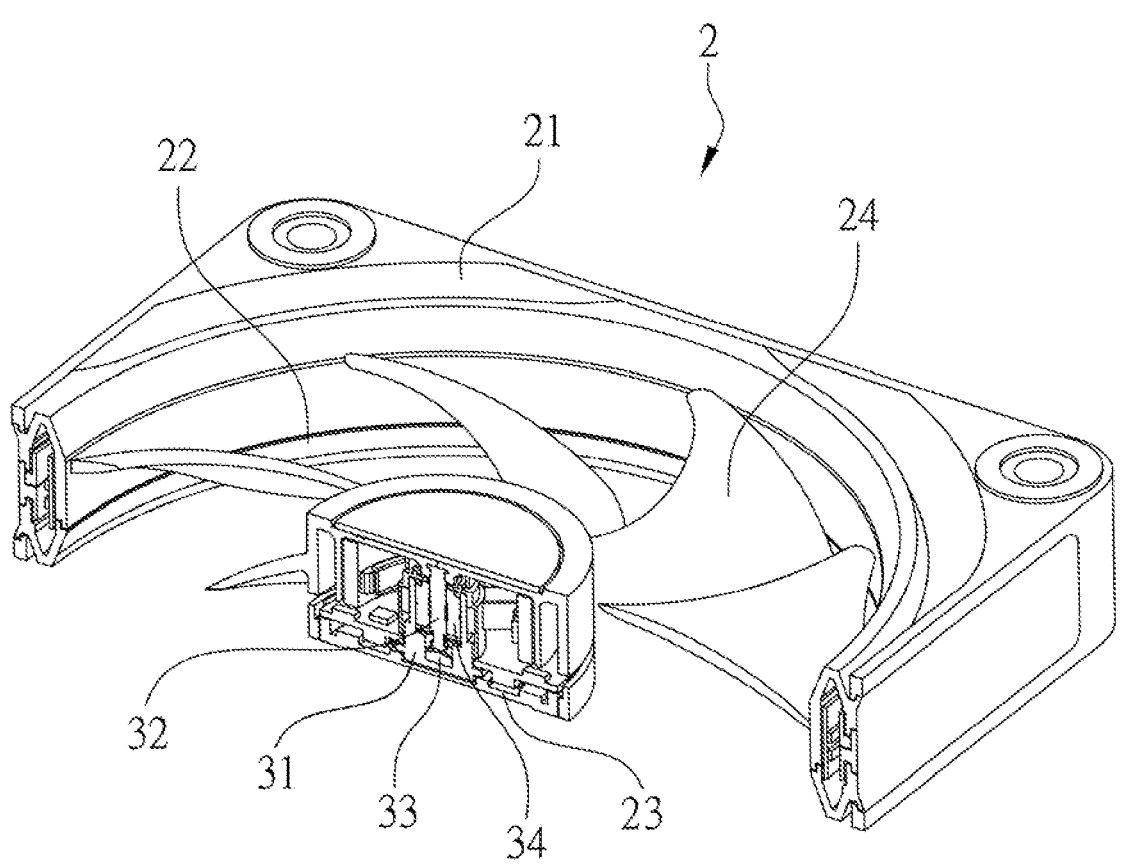
FIG. 2 shows a partial cross-section view of a bearing structure of a fan according to an embodiment.

As shown in FIG. 2, an embodiment of the present invention provides a bearing structure designed for installation in a fan 2. The fan 2 comprises a fan casing 21, a ventilation hole 22 defined by the fan casing 21, and a bearing seat 23 connected to the fan casing 21 and positioned within the ventilation hole 22. The bearing structure is located within the bearing seat 23 and has multiple fan blades 24. As non-limiting examples, the fan 2 may serve as a cooling component for a computer's motherboard.

Figure 3:
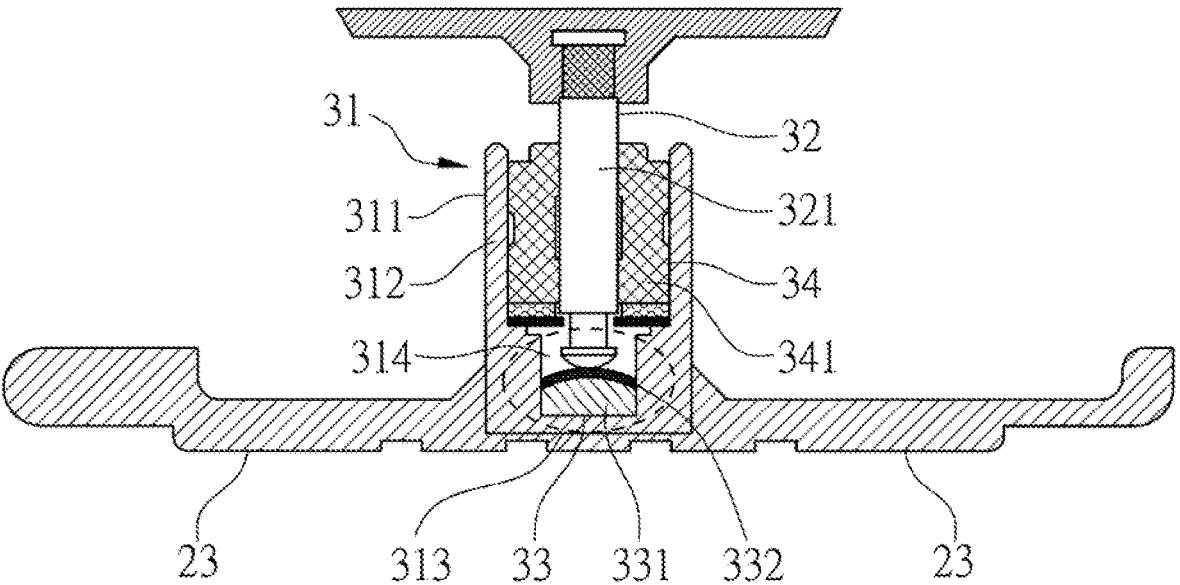
FIG. 3 shows a sectional view of a base unit, a rotating unit, a first lubricating unit, and a second lubricating unit according to an embodiment.

Referring to FIG. 2 and FIG. 3, the bearing structure comprises a base unit 31, a rotating unit 32, a first lubricating unit 33, and a second lubricating unit 34.

The base unit 31 is positioned upright on the bearing seat 23, and includes a base 311, a surrounding wall 312 positioned around the base 311, a bottom wall 313 connected to the bottom of the surrounding wall 312, and an accommodating groove 314 defined by the surrounding wall 312 and the bottom wall 313. The accommodating groove 314 has a cylindrical shape.

The rotating unit 32 includes a rotating shaft 321, which is positioned in the accommodating groove 314. The rotating shaft 321 is vertically mounted in the accommodating groove 314 and extends upward. The top of the rotating shaft 321 is connected to the multiple fan blades 24 (not shown), and the rotating shaft 321 drive the rotation of the multiple fan blades 24 relative to the fan 2.

The first lubricating unit 33 includes a first bearing 331, which is positioned in the accommodating groove 314 and connected to the bottom wall 313. The first bearing 331 is set at the bottom of the accommodating groove 314 and closely fits with the base 311. The bottom end of the rotating shaft 321 presses against the upper surface of the first bearing 331.

The second lubricating unit 34 includes a second bearing 341, which is positioned in the accommodating groove 314, and between the rotating shaft 321 and the surrounding wall 312. The second bearing 341 secures and stabilizes the position of the rotating shaft 321, enabling the rotating shaft 321 to rotate relative to the base unit 31. The specific details of the second bearing 341 are well-known and won't be further elaborated here.

Figure 4:
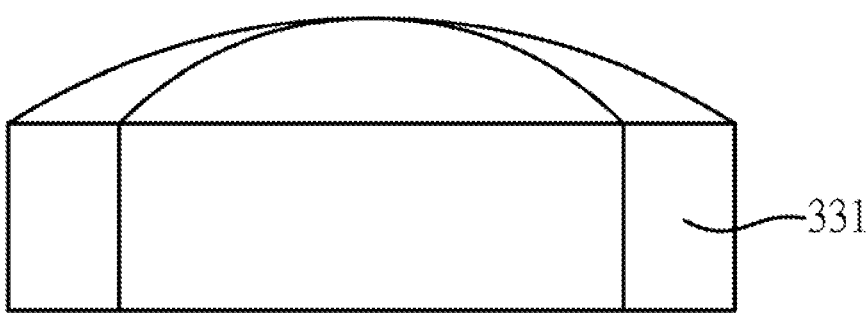
FIG. 4 shows a side view of a first bearing of the embodiment.
Figure 5A:
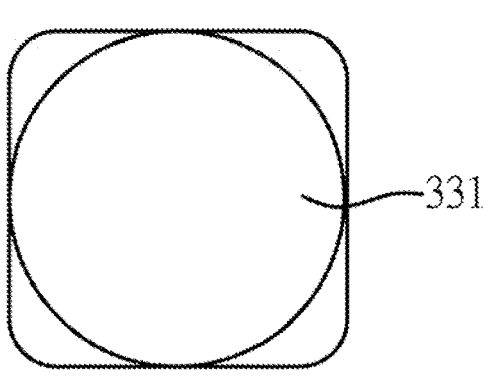
FIG. 5A-5C show top views of different structural configurations of the first bearing according to an embodiment.
Figure 5B:
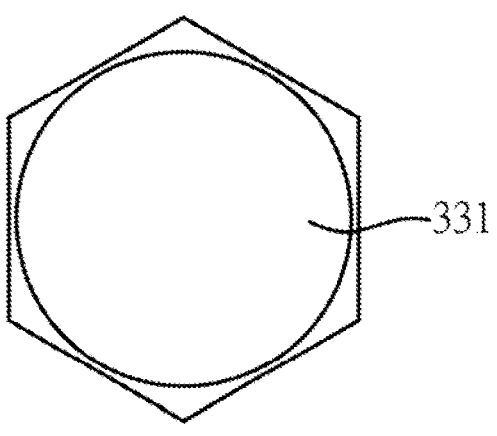
Figure 5C:
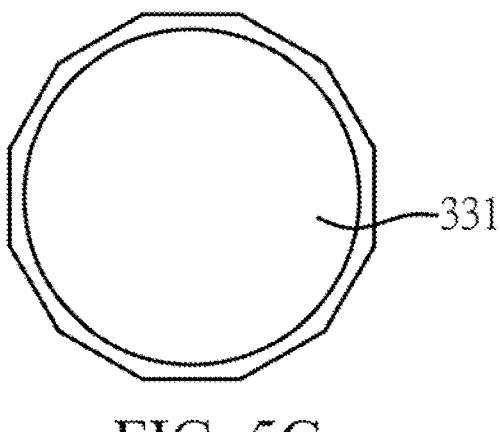

The appearance of the first bearing 331 can be either cylindrical or prismatic. As illustrated in FIG. 4, the side edge structure of the first bearing 331 has a cylindrical shape with an upward protruding dome-shaped profile on the upper surface. As non-limiting examples, the circular arc radius of the upper surface of the first bearing 331 could be R4.81 mm. Moreover, as shown in FIGS. 5A to 5C, various prismatic structures such as square, hexagonal, and dodecagonal shapes are possible for the side edge of the first bearing 331. The choice of the first bearing's 331 structural shape is made to match the shape of the base 311 in the accommodating groove 314, ensuring the first bearing 331 to be positioned at the bottom of the accommodating groove 314 and closely fitted with the base 311.

Figure 6:
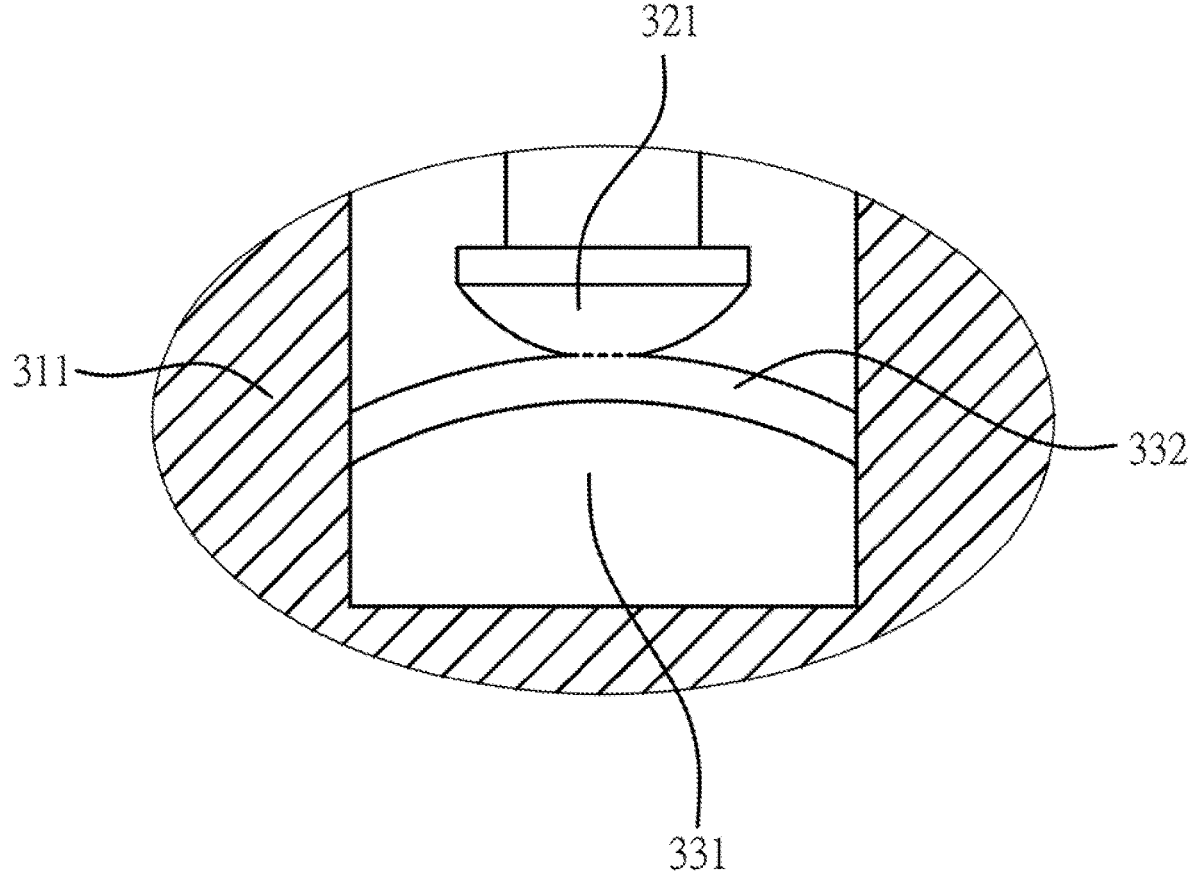
FIG. 6 shows a partial cross-section view of the configuration of a rotating shaft and a first lubricating unit according to an embodiment.

Referring now to FIG. 6, the first lubricating unit 33 includes a carbon pad 332 placed on the upper surface of the first bearing 331. The carbon pad 332 has a thickness greater than 0.3 mm, and is made of graphite. As non-limiting examples, the carbon pad 332 may be omitted from the first bearing 331, and the material of the carbon pad 332 may be selected from the group consisting of graphite, polytetrafluoroethylene (PTFE), polyester film and combinations thereof. The lower surface of the carbon pad 332 is designed to fit with the upper surface of the first bearing 331, ensuring the carbon pad 332 to securely place on the first bearing 331. Additionally, utilizing graphite as the material for the carbon pad 332 is beneficial not only because it is harder than some other materials like plastic but also due to the fine powder generated from graphite during wear, which can create a lubricating effect between the first bearing 331 and the carbon pad 332.

Furthermore, the bottom end of the rotating shaft 321 features a downward protruding dome-shaped profile, and the upper surface of the carbon pad 332 exhibits an upward protruding dome-shaped profile. When the bottom end of the rotating shaft 321 presses against the upper surface of the carbon pad 332 and rotates, they come into contact with the minimal possible surface area. As a result, friction between the rotating shaft 321 and the carbon pad 332 is effectively reduced.

Due to the curved dome-shape of the peripheral edge of the first bearing 331 or the carbon pad 332, it allows for more lubricating oil to be accommodated in the outer space surrounding the first bearing 331 or the carbon pad 332. This increased oil capacity provides more lubrication between the rotating shaft 321 and the first bearing 331 or the carbon pad 332

Additionally, the rotating shaft 321 and the first bearing 331 may both made of magnetic materials, enabling the rotating shaft 321 to magnetically attract to the first bearing 331. As non-limiting examples, the material of the first bearing 331 may be a magnet, while the rotating shaft 321 may be made of a magnetic metal that is capable of being magnetically attracted, such as iron, alnico, rare-earth magnet, and so on. When the rotating shaft 321 and the first bearing 331 are mutually magnetically attracted, it reduces the likelihood of the first bearing 331 detaching from the fan 2. With the above elaboration, the present invention has the following features:

1. Friction Reduction

The design of the downward protruding dome shape at the bottom of the rotating shaft 321 and the upward protruding dome shape of the upper surface of the carbon pad 332 ensures that when the rotating shaft 321 presses against the carbon pad 332 and rotates, they come into contact with the minimal possible surface area. This arrangement effectively minimizes friction between the rotating shaft 321 and the carbon pad 332.

2. Increased Lubricant Capacity

The dome-shaped design of the outer edge of the first bearing 331 or the carbon pad 332 allows for a larger amount of lubricating oil to be stored in the outer edge space of the first bearing 331 or the carbon pad 332. This oil reservoir ensures sufficient lubrication between the rotating shaft 321 and the first bearing 331 or the carbon pad 332.

3. Minimized Mechanism Friction and Noise

The carbon pad 332 has a thickness greater than 0.3 mm, and the dome-shaped surface has a radius of R4.81 mm. Being made of graphite in an embodiment, which is harder than other materials like plastic, the carbon pad 332 itself possesses a lubricating effect. The flaky crystal structure and small friction coefficient of graphite further contribute to reducing friction loss between mechanisms, thereby diminishing operational noise levels.

In conclusion, the upward protruding dome shape employed in either the carbon pad 332 or the first bearing 331, combined with the utilization of graphite for the carbon pad 332, effectively minimizes the contact area with the rotating shaft 321. This outcome leads to diminished friction, subsequently reducing operational noise and enabling higher lubricating oil retention. Therefore, the aforementioned features of the present invention can be achieved.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A bearing structure, comprising:
   a base unit, including a base, a surrounding wall coupled to the base, a bottom wall connected to the bottom of the surrounding wall, and a cavity defined by the surrounding wall and the bottom wall;
   a rotating unit, including a rotating shaft arranged in the cavity; and
   a first lubricating unit, including a first bearing arranged in the cavity and connected with the bottom wall, and a carbon-containing pad arranged on the upper surface of the first bearing, the carbon-containing pad being made of graphite, the bottom end of the rotating shaft pressing against the upper surface of the carbon-containing pad, the upper surface of the first bearing featuring an upward protruding substantially dome-shaped profile;
   wherein the thickness of the carbon-containing pad is greater than 0.3 mm, the bottom end of the rotating shaft features a downward protruding dome-shaped profile, the upper surface of the carbon-containing pad exhibits an upward protruding dome-shaped profile, and the lower surface of the carbon-containing pad is designed to mate with the upper surface of the first bearing, allowing the carbon-containing pad to be securely coupled to the first bearing.

2. The bearing structure as claimed in claim 1, wherein at least one of the rotating shafts and the first bearing are made of magnetic material, and the rotating shaft magnetically attracts to the first bearing.

3. The bearing structure as claimed in claim 2, wherein the rotating shaft is made of a metal or metal alloy that can be magnetically attracted, and the material of the first bearing is a magnet.

4. The bearing structure as claimed in claim 1, wherein the shape of the first bearing is either substantially a cylinder or substantially a prism.

5. The bearing structure as claimed in claim 1, further comprises a second lubricating unit, the second lubricating unit including a second bearing configured in the cavity and positioned between the rotating shaft and the surrounding wall.

\* \* \* \* \*